July 3, 1956

S. H. M. DODINGTON 2,753,507

MOTOR SPEED CONTROL

Filed Feb. 28, 1955

INVENTOR
SVEN H. M. DODINGTON
BY Henry Kolin
AGENT

United States Patent Office 2,753,507
Patented July 3, 1956

2,753,507
MOTOR SPEED CONTROL

Sven H. M. Dodington, Nutley, N. J., assignor to International Telephone and Telegraph Corporation, Nutley, N. J., a corporation of Maryland Application February 28, 1955, Serial No. 490,905

5 Claims. (Cl. 318—341)

This invention relates to circuits for controlling the power supplied to electric motors and more particularly to circuits using relays for controlling the power supplied to remotely controlled electric motors of servomechanisms.

In many small servomechanism systems, a need exists for obtaining variable speeds of a motor controlled by a signal source. A commonly employed method is to used a two-phase alternating-current motor, one winding being in the anode circuit of an electric discharge device serving as control tube. Another method employs a direct-current motor with the field winding in the anode circuit of the control tube. Where power requirements are substantial, both of these methods require the use of a fairly large control tube. Such an arrangement is disadvantageous in that control tubes having high power-handling capacities are costly; furthermore, where the motor is required to be operated only intermittently, for instance in a channel-selection servomechanism system, such tubes are employed in an inefficient manner. Consequently, for such channel-selection servomechanisms it has been found preferable to use relay-controlled motors, thereby eliminating the need for using large-sized tubes capable of handling high plate currents. Thus a relatively small signal can control substantial amounts of power. However, inasmuch as the relay provides only an on-off type of control the resulting performance of the servomechanism is relatively poor, the motor does not operate in a smooth or accurate manner, and the motor speed is not uniformly variable. Thus the fineness of control or speed of response is considerably less than in systems having proportional speed control.

An object of this invention is to provide a motor control system to effect smooth and uniform control of the speed of an electric motor.

Another object is to provide a circuit wherein the large power-handling capacity of a relay is retained while at the same time the advantage of variable speed under the control of a small signal is provided.

It is a feature of this invention that variable power is provided for controlling the speed of an electric motor by means of a variable duty cycle.

It is a further specific feature that this variable duty cycle is in turn controlled by feedback from across the motor.

Further objects and features of this invention will be seen from the following description taken in conjunction with the drawings, in which.

Figure 1:
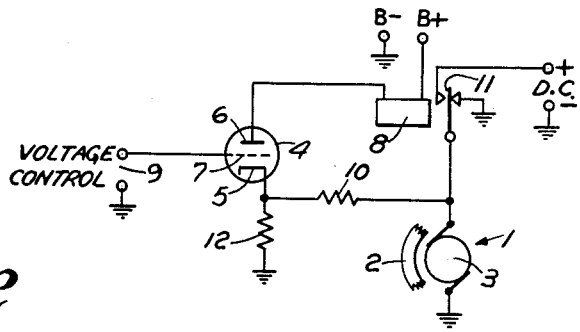
Fig. 1 represents a schematic view of a circuit for controlling the speed of an electric motor in accordance with this invention.

Referring to Fig. 1, a direct current motor 1 is shown with a permanent magnetic field 2 serving as stator element of the motor, and a motor armature 3 serving as rotor element of the motor. An electric discharge device 4 having at least a cathode 5, anode 6 and control grid 7 is provided for controlling the current supplied to the relay coil 8 located in the anode circuit of the control tube. A control voltage 9 serves to bias the grid 7 positively with respect to cathode 5. One side of the rotor element 3 is grounded, and from the ungrounded side an impedance, such as resistor 10, serves to connect the motor armature circuit to the cathode 5. As the positive control voltage 9 applied to the grid of the tube increases, the current in relay coil 8 increases until the movable relay contact member 11 is actuated, thereby applying a direct voltage, such as 28 volts, to the armature of the motor. However, at this instant, because of the current feedback through resistor 10 and cathode resistor 12, both resistors being of approximately the same value, 14 volts is applied to the cathode of the tube, thereby greatly reducing the flow of current in the plate circuit. This causes the relay contact 11 to break connection to the power source almost immediately. The cathode voltage is thereby reduced, again permitting the relay to be actuated to apply power to the rotor 3. Consequently a rapid vibrating or chattering action is obtained in the relay contact 11, the motor 1 being alternately energized and de-energized. The duty cycle of the motor current is obviously less than unity, and the resultant motor speed is therefore less than the full speed of the motor when operated at 28 volts without any current interruption.

Figure 2:
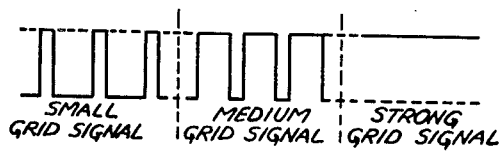
Fig. 2 is a graphical representation of the variation of motor voltage obtained with variation in grid signal in the operation of the circuit shown in Fig. 1.

Referring to Fig. 2, it will be seen that the duty cycle of the motor current obtained in the operation of the circuit shown in Fig. 1 will vary with the magnitude of the grid control voltage applied. Thus, where a small grid signal level is used, the feedback is relatively strong and dominant so that the relay contact opens almost immediately after it has closed. For such a condition there will be relatively small "on" cycle and relatively longer "off" cycle. For a medium grid signal, the feedback has less effect relatively, and the relay stays closed for longer periods. Where a very strong grid signal is applied, the feedback has no effect on the plate current and the motor operates at full speed. It will, of course, be apparent to those skilled in the art that the rate at which the relay contact chattering action takes place is dependent on the time constants of the particular relay used. This action can be slowed by placing a capacitor in parallel with the relay coil or in parallel with the cathode resistor. However, the fastest action gives the smoothest control. Where the electric discharge device used is a conventional vacuum tube pentode, faster control action will be obtained than with a triode. However, for the circuit illustrated in Fig. 1 a triode is also satisfactory because of the constant current action of the unbypassed cathode resistor.

A further advantage of the feedback feature as applied in this invention is that the circuit is fairly free from critical values. Thus, referring to Fig. 3, it will be obvious, for instance, that a decrease in the 28-volt supply reduces the feedback and therefore provides a greater duty cycle to the motor. Thus, at speeds below maximum the motor speed is primarily dependent on the control voltage and not on its own supply voltage.

Figure 3:
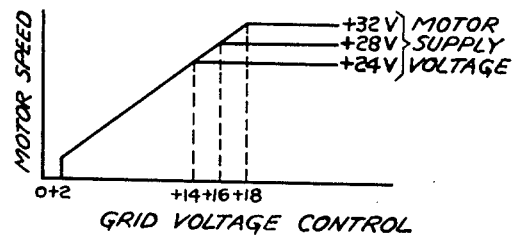
Fig. 3 is a graphical representation of the dependence of motor speed upon grid control voltage.

This is clearly shown in Fig. 3. Because of this effect, a considerable range of motor speed control over values of almost 100 to 1 is feasible. For most servomechanism applications, a range of even 10 to 1 results in a sufficiently improved performance to render this circuit highly desirable.

The use of the novel feedback feature employed in the circuits of this invention does not interfere with obtaining the advantages present in using associated known relay circuits. Thus, in the motor-control circuits of this invention, there may be used: spark suppression networks across the relay contacts; an alternating-current plate supply for the tube with an in-phase or out-of-phase alternating current on the grid; an alternating-current motor with alternating-current feedback to the cathode in phase with the grid voltage, or feedback to the grid out-of-phase grid voltage; two relays to give control of both directions of rotation; as well as many other typical circuits utilizing the novel features of this invention.

Figure 4:
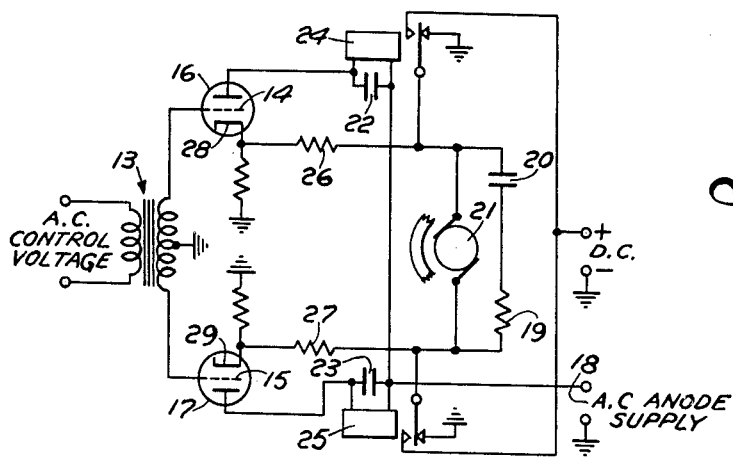
Fig. 4 is a schematic view of a push-pull circuit version of Fig. 1.

For example, in Fig. 4 is shown a straightforward push-pull circuit version of Fig. 1, wherein an alternating control voltage 13 varying in amplitude and phase is used to bias the grids 14 and 15 of control tubes 16 and 17, respectively. The alternating-current plate supply 18 is maintained at the same frequency as the control voltage 13. A spark supression network consisting of a series-connected resistor 19-capacitor 20 combination is connected across the terminals of the motor rotor 21 circuit. Capacitors 22 and 23 are connected in parallel with relay coils 24 and 25, respectively, to reduce alternating-current ripple in the relay coils. Feedback from the motor to the control tubes is obtained by the flow of current through resistors 26 and 27 to respective cathodes 28 and 29. The known advantages of push-pull circuit operation, such as improvement in the linearity of tube characteristics, is readily obtained with the circuit illustrated in Fig. 4. Such a circuit is additionally useful when the need arises for relatively rapid channel selection.

Figure 5:
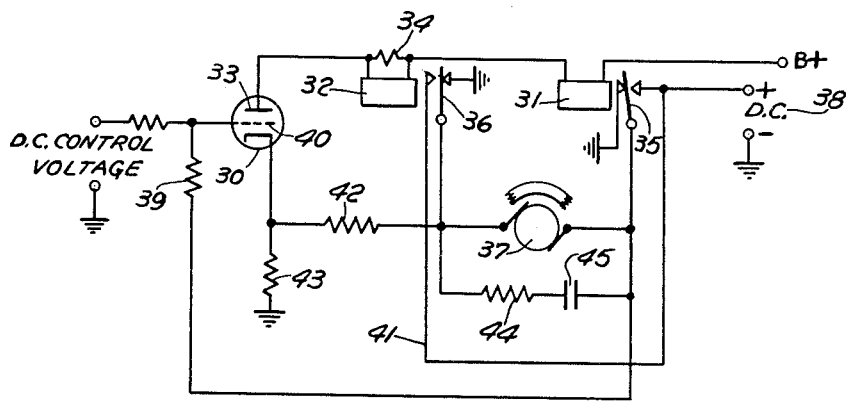
Fig. 5 is a schematic view of another circuit embodiment used for controlling the speed of an electric motor in accordance with this invention; and, Fig. 6 is a graphical representation of the motor speed control characteristics of the circuit shown in Fig. 5.
Figure 6:
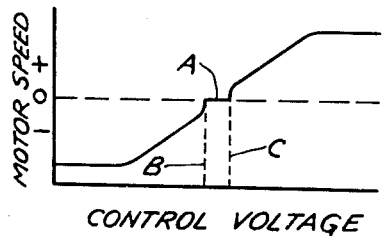

In Fig. 5 is shown an additional embodiment of this invention wherein a single tube 30 is used together with relays 31 and 32, both in series with the anode circuit 33 of the tube. Such an arrangement results in tube economy. In this circuit, the second relay 32 is made less sensitive than the first relay 31 by use of resistance 34 in parallel with the coil of the relay 32. Referring to Fig. 5 taken in conjunction with Fig. 6, it is seen that at a midpoint A in the control characteristic where the first relay 31 is actuated by current of a predetermined value B, movable contact 35 is moved to the left in the grounded position shown, the movable contact 36 of relay 32 remaining in the grounded position shown, thus resulting in both sides of motor rotor 37 being grounded. Should the current flowing in control tube 30 decrease below said predetermined value B, the relay 31 is de-energized causing the contact 35 to be moved to the right, closing the rotor circuit with source 38 to drive the motor in one direction. At the same time, feedback passing through resistor 39 is applied to grid 40 of tube 30, thereby serving to make the grid more positive. This results in an increase in the anode current. As the anode current increases to value B, the movable relay contact 35 will be actuated by the coil of relay 31 to break the rotor driving circuit, again grounding both sides of this rotor. Should the current of tube 30 reach the value C, the relay 32 will be actuated moving the contact 36 thereof to the left closing a circuit 41 from source 38 in the reverse direction through the rotor. This results in the motor being driven in the opposite direction. During this reverse drive, the feedback is through resistor 42 causing the cathode to become more positive, thereby reducing the current flowing in the anode circuit. This reverse drive continues until the anode current drops below the value C thereby deactivating relay 32 and grounding both sides of rotor 37. It is readily seen that the circuit arrangement illustrated in Fig. 5, depending upon the values selected for resistors 39, 42 and 43 and for the direct control voltage, can readily yield a wide range of variable speed controls. In order to obtain the simplicity of this control circuit and the economy in use of tubes, a relatively critical adjustment of the relay settings may be required. The resistor 44 and capacitor 45 are connected across the rotor to minimize sparking.

It will be apparent to those skilled in this art that many other circuit arrangements and types of gas discharge devices, such as grid-controlled gas tubes as well as vacuum tubes, may be used without departing from the principles of this invention, namely, the provision of variable power by means of a variable motor duty cycle, the duty cycle in turn being controlled by feedback from across the motor. Such an arrangement is particularly advantageous where a motor is operated intermittently and yet relatively high powers are required during the period of operation.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for varying the speed of an electric motor comprising an electric motor having a rotor circuit, an electric discharge device containing at least a cathode, an anode and a control grid, impedance means interconnecting said rotor circuit and cathode to provide current feedback to said cathode, thereby serving to increase the cathode voltage during periods of current flow in said rotor circuit, a relay having a coil and a movable contact member to control current flow in said rotor circuit, said coil being connected in series with said anode whereby current flowing through the anode circuit energizes said coil and actuates said contact member to thereby energize said rotor circuit, and signal means for applying a voltage to the grid of said electric discharge device.

2. A system for varying the speed of an electric motor comprising an electric rotor having a rotor circuit, a pair of electric discharge devices connected in push-pull circuit arrangement, each of said discharge devices containing at least a cathode, an anode and a control grid, impedance means interconnecting opposite sides of said rotor circuit and each of said cathodes, respectively, to provide current feedback to each of said cathodes, thereby serving to increase the cathode voltage during periods of current flow in the respective portion of said rotor circuit, a pair of relays each having a coil and a movable contact member to control current flow in said rotor circuit, each said coil being connected in series with its respective anode whereby current flowing through the respective anode circuit energizes said coil and actuates said corresponding contact member to thereby energize said rotor circuit, and signal means disposed in push-pull circuit arrangement connected to each of said electric discharge devices for applying a voltage to the grid of each of said discharge devices.

3. A system according to claim 2 wherein the signal means applied to the grids of said electric discharge devices comprises an alternating control voltage having a given frequency and the current supply to each of the anode circuits is an alternating current of the same frequency as the control voltage.

4. A system for varying the speed of an electric motor comprising an electric motor having a rotor circuit, an electric discharge device containing at least a cathode, an anode and a control grid, first impedance means interconnecting a portion of said rotor circuit and cathode to provide current feedback to said cathode thereby serving to increase the cathode voltage and decrease the anode current during periods of current flow in said rotor circuit, first and second relays each having a coil and a movable contact member to control current flow in said rotor circuit, said relay coils being energizable by different current values and both said coils being connected in series with said anode whereby current flowing through the anode circuit below a predetermined value causes one of said coils to be energized and when it exceeds said predetermined value both of said coils are energized, and signal means for applying a voltage to the grid of said electric discharge device.

5. A system for varying the speed of an electric motor comprising an electric motor having a rotor circuit, an electric discharge device containing at least a cathode, an anode, and a control grid, first impedance means interconnecting a portion of said rotor circuit and cathode to provide current feedback to said cathode thereby serving to increase the cathode voltage and decrease the anode current during periods of current flow in said rotor circuit, second impedance means interconnecting a portion of said rotor circuit and said control grid to provide feedback to said grid, thereby serving to increase the anode current during periods of current flow in said rotor circuit, first and second relays each having a coil and a movable contact member to control current flow in said rotor circuit, said relay coils being energizable by different current values and both said coils being connected in series with said anode, said first relay being sensitive to currents of a predetermined value to move its associated contact to a circuit controlling position to de-energize said rotor circuit, and said second relay being sensitive to a current value above said predetermined value to move its associated contact to a circuit controlling position to energize said rotor circuit for motor operation in the opposite direction to which it is driven prior to actuation of said first relay.

References Cited in the file of this patent

UNITED STATES PATENTS 2,495,382   Morton _____ Jan. 24, 1950